United States Patent
Chen et al.

(10) Patent No.: US 11,477,838 B2
(45) Date of Patent: Oct. 18, 2022

(54) COMMUNICATION METHOD AND COMMUNICATIONS APPARATUS FOR HANDLING BEAM FAILURE

(71) Applicant: Huawei Technologies Co., Ltd., Shenzhen (CN)

(72) Inventors: Lei Chen, Chengdu (CN); Peng Guan, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 48 days.

(21) Appl. No.: 17/093,026

(22) Filed: Nov. 9, 2020

(65) Prior Publication Data
US 2021/0058999 A1  Feb. 25, 2021

Related U.S. Application Data

(63) Continuation of application No. PCT/CN2019/085845, filed on May 7, 2019.

(30) Foreign Application Priority Data

May 11, 2018 (CN) .......................... 201810450898.0

(51) Int. Cl.
*H04W 76/19* (2018.01)
*H04W 24/04* (2009.01)
*H04W 72/04* (2009.01)

(52) U.S. Cl.
CPC .......... *H04W 76/19* (2018.02); *H04W 24/04* (2013.01); *H04W 72/042* (2013.01)

(58) Field of Classification Search
CPC ... H04W 76/19; H04W 24/04; H04W 72/042; H04W 16/28; H04W 56/00;
(Continued)

(56) References Cited

U.S. PATENT DOCUMENTS

2016/0183242 A1   6/2016 Cordeiro et al.
2018/0227899 A1*  8/2018 Yu .................... H04B 7/0695
(Continued)

FOREIGN PATENT DOCUMENTS

CN    107547115 A    1/2018
CN    107612602 A    1/2018
WO    2018075188 A1  4/2018

OTHER PUBLICATIONS

"3rd Generation Partnership Project; Technical Specification Group Radio Access Network; NR; Physical layer procedures for control (Release 15)," 3GPP TS 38.213 V15.1.0, Mar. 2018, 77 pages.

(Continued)

*Primary Examiner* — Kiet Tang
(74) *Attorney, Agent, or Firm* — Slater Matsil, LLP

(57) ABSTRACT

A communication method and a communications apparatus. The method includes determining an available downlink beam in response to detecting a beam failure, determining a first uplink beam according to the downlink beam, sending a beam failure recovery request to a network device using the first uplink beam, receiving a beam failure recovery response sent by the network device, and sending, using the first uplink beam, after receiving the beam failure recovery response, before receiving beam configuration information sent by the network device, at least one of a physical uplink control channel or a physical uplink shared channel, where the beam configuration information indicates a second uplink beam.

18 Claims, 5 Drawing Sheets

(58) Field of Classification Search
CPC .......... H04W 72/0406; H04W 72/046; H04W 74/0833; H04B 7/0695; H04B 7/088
See application file for complete search history.

(56) References Cited

U.S. PATENT DOCUMENTS

2019/0053294 A1* 2/2019 Xia .................. H04W 72/0413
2019/0074882 A1* 3/2019 Zhou .................... H04L 5/0053

OTHER PUBLICATIONS

"Details for UL Beam Management," Source: Intel Corporation, Agenda item: 7.1.2.2.1, Document for: Discussion and Decision, 3GPP TSG-RAN WG1 #88bis, R1-1707354, Hangzhou, China, May 15-19, 2017, 8 pages.

"Discussion on Beam Correspondence Validity," Agenda item: 7.1.2.2.3, Source: China Unicom, Document for: Discussion, 3GPP TSG RAN WG1 Meeting #89, R1-1708871, Hangzhou, P.R. China May 15-19, 2017, 3 pages.

"On Remaining Details of Beam Failure Recovery," Agenda Item: 6.1.2.2.7, Source: InterDigital, Inc., Document for: Discussion and Decision, 3GPP TSG RAN WG1 Meeting #90, R1-1714142, Prague, P.R. Czech Aug. 21-25, 2017, 6 pages.

"Consideration on Beam Failure Recovery," Source: CATT, Agenda Item: 7.2.2.4, Document for: Discussion and Decision, 3GPP TSG RAN WG1 Meeting 90bis, R1-1717813, Prague, CZ, Oct. 9-13, 2017, 5 pages.

"Remaining Details on Beam Recovery," Agenda item: 7.1.2.2.4, Source: Nokia, Nokia Shanghai Bell, Document for: Discussion and Decision, 3GPP TSG-RAN WG1 Meeting #92, R1-1802557, Athens, Greece, Feb. 26-Mar. 2, 2018, 6 pages.

* cited by examiner

COMMUNICATION METHOD AND COMMUNICATIONS APPARATUS FOR HANDLING BEAM FAILURE

CROSS-REFERENCE TO RELATED APPLICATIONS

This application is a continuation of International Application No. PCT/CN2019/085845, filed on May 7, 2019, which claims priority to Chinese Patent Application No. 201810450898.0, filed on May 11, 2018. The disclosures of the aforementioned applications are hereby incorporated by reference in their entireties.

TECHNICAL FIELD

This application relates to the field of communications technologies, and in particular, to a communication method and a communications apparatus.

BACKGROUND

In a beam-based communications system, a transmit end centrally transmits signals in a specific direction to obtain a beam gain, and a receive end adjusts a beam receiving mode to obtain as much signal energy as possible. However, due to movement, blocking, channel interference, quality of communication using a pair of transmit and receive beams that are currently used for communication may deteriorate, or even the communication cannot be performed normally. To resolve a beam failure caused by deterioration of beam communication quality, a terminal device needs to detect a current beam. When quality of the detected beam is continuously lower than a threshold, the terminal device may determine that the beam failure occurs, and enter a beam recovery procedure. In a new radio (NR) access technology, a beam object for beam failure detection is a beam on a control channel. Specifically, during one detection, when quality of beams on all control channels is lower than a threshold, it is considered as one beam failure instance. When the beam failure instance consecutively occurs for a specific quantity, the terminal device may determine that the beam failure occurs. When determining that the beam failure occurs, the terminal device enters the beam recovery procedure.

During beam failure recovery, quality of communication using an uplink beam pair and quality of communication using a downlink beam pair both need to be ensured. Theoretically, when a time-varying characteristic of a channel and a non-ideal characteristic of a component at a transmit/receive end are not considered in a time division multiplexing system, if transmit and receive beams used for uplink and downlink communication are exactly the same (that is, beam directions, gains, beam widths, and the like are exactly the same), there is reciprocity between an uplink beam pair and a downlink beam pair of a network device and the terminal device, that is, a channel response of the uplink beam pair is the same as that of the downlink beam pair. Therefore, when the terminal device can detect an available downlink beam (that is, the downlink beam pair is available), there is a high probability that the uplink beam pair is available when the reciprocity is good. After detecting the available downlink beam, the terminal device may select, based on an antenna weight of a receive beam corresponding to the downlink beam, a corresponding uplink beam to send a beam failure recovery request.

However, when an uplink beam and a downlink beam of the terminal device are not well consistent, the terminal device cannot directly determine a corresponding uplink beam based on the downlink beam. FIG. 1 is a schematic diagram of a scenario in which an uplink beam pair and a downlink beam pair are inconsistent. In a downlink, a transmit beam BS-TX-1 on a network device side and a receive beam UE-RX-2 on a terminal device side form a downlink beam pair. In an uplink, because there is no uplink-downlink consistency on the terminal device side, an uplink beam UE-TX-2 corresponding to an antenna weight of a downlink receive beam UE-RX-2 does not match a receive beam BS-TX-1 on the network device side. From a perspective of channel reciprocity, another uplink beam UE-TX-1 of the terminal device has better reciprocity. In this case, in a possible solution, the terminal device sends the beam failure recovery request in an uplink beam sweeping manner, but this causes interference in a cell and causes an additional beam recovery delay. In another method, the terminal device roughly determines a transmit beam (for example, directly uses a weight of a receive antenna as a weight of a transmit antenna) based on a receive weight of a downlink beam. However, because a downlink receive beam and an uplink transmit beam of the terminal device are inconsistent, there is no reciprocity between the uplink and the downlink of the terminal device and the network device. In this case, a beam failure recovery request sent by the terminal device may not be received by the network device.

Therefore, when receive and transmit beams may be inconsistent, how to associate an uplink beam with a downlink beam to improve efficiency of beam failure recovery is a problem that needs to be resolved in this application.

SUMMARY

This application provides a communication method and a communications apparatus, so that a terminal device accurately obtains information about an association between an uplink beam and a downlink beam, thereby improving efficiency of beam failure recovery.

According to a first aspect, a communication method is provided, including receiving information that is about an association relationship between a downlink beam and an uplink beam and that is sent by a network device, determining an available downlink beam when a beam failure is detected, determining, based on the information about the association relationship between a downlink beam and an uplink beam, an uplink beam corresponding to the available downlink beam, and sending a beam failure recovery request to the network device based on the determined uplink beam.

Alternatively, according to a first aspect, a communication method is provided, including receiving a correspondence that is between an index of a downlink reference signal resource or a synchronization signal block and an index of an uplink reference signal resource and that is sent by a network device, determining an available downlink reference signal resource or a synchronization signal block when a beam failure is detected, determining, based on the correspondence between an index of a downlink reference signal resource or a synchronization signal block and an index of an uplink reference signal resource, an index of an uplink reference signal resource corresponding to the determined index of the downlink reference signal resource or the synchronization signal block, and sending a beam failure recovery request to the network device based on the determined index of the uplink reference signal resource.

In this aspect, the terminal device receives the information that is about the association relationship between a downlink beam and an uplink beam and that is sent by the network device, and sends, based on the uplink beam corresponding to the available downlink beam, the beam failure recovery request to the network device when the beam failure occurs, so that the network device can accurately receive the beam failure recovery request, thereby improving efficiency of beam failure recovery.

With reference to the first aspect, in a first possible implementation, the information about the association relationship includes a correspondence between an index of a downlink reference signal resource or a synchronization signal block and an index of an uplink reference signal resource. The determining, based on the information about the association relationship between a downlink beam and an uplink beam, an uplink beam corresponding to the available downlink beam includes determining an index of a downlink reference signal resource or a synchronization signal block corresponding to the available downlink beam, and determining, based on the correspondence between an index of a downlink reference signal resource or a synchronization signal block and an index of an uplink reference signal resource, an index of an uplink reference signal resource corresponding to the determined index of the downlink reference signal resource or the synchronization signal block. The sending a beam failure recovery request to the network device based on the determined uplink beam includes sending the beam failure recovery request to the network device based on an uplink beam corresponding to the determined index of the uplink reference signal resource.

With reference to the first possible implementation of the first aspect, in a second possible implementation, the correspondence between an index of a downlink reference signal resource or a synchronization signal block and an index of an uplink reference signal resource includes one or more of the following cases: an index of one downlink reference signal resource or one synchronization signal block corresponds to an index of one uplink reference signal resource, an index of one downlink reference signal resource or one synchronization signal block corresponds to indexes of a plurality of uplink reference signal resources, indexes of a plurality of downlink reference signal resources or a plurality of synchronization signal blocks correspond to an index of one uplink reference signal resource, and indexes of a plurality of downlink reference signal resources or a plurality of synchronization signal blocks correspond to indexes of a plurality of uplink reference signal resources.

With reference to the first possible implementation of the first aspect or the second possible implementation of the first aspect, in a third possible implementation, the method further includes receiving information that is about a correspondence between an index or indexes of one or more signal resources and a random access resource or a physical uplink control channel resource and that is sent by the network device, where the one or more signal resources include an uplink reference signal resource, a downlink reference signal resource, and a synchronization signal block.

According to a second aspect, a communication method is provided, including sending information about an association relationship between a downlink beam and an uplink beam to a terminal device, and receiving a beam failure recovery request that is sent by the terminal device on the uplink beam, where the uplink beam is an uplink beam corresponding to an available downlink beam.

Alternatively, according to a second aspect, a communication method is provided, including sending, to a terminal device, a correspondence that is between an index of a downlink reference signal resource or a synchronization signal block and an index of an uplink reference signal resource, and receiving a beam failure recovery request that is sent by the terminal device based on the index of the uplink reference signal resource, where the index of the uplink reference signal resource corresponds to an index of an available downlink reference signal resource.

In this aspect, a network device sends, to the terminal device, the information about the association relationship between a downlink beam and an uplink beam. The terminal device receives the information about the association relationship, and sends, based on the uplink beam corresponding to the available downlink beam, the beam failure recovery request to the network device when a beam failure occurs, so that the network device can accurately receive the beam failure recovery request, thereby improving efficiency of beam failure recovery.

With reference to the second aspect, in a first possible implementation, the information about the association relationship includes a correspondence between an index of a downlink reference signal resource or a synchronization signal block and an index of an uplink reference signal resource.

With reference to the first possible implementation of the second aspect, in a second possible implementation, the correspondence between an index of a downlink reference signal resource or a synchronization signal block and an index of an uplink reference signal resource includes one or more of the following cases: an index of one downlink reference signal resource or one synchronization signal block corresponds to an index of one uplink reference signal resource, an index of one downlink reference signal resource or one synchronization signal block corresponds to indexes of a plurality of uplink reference signal resources, indexes of a plurality of downlink reference signal resources or a plurality of synchronization signal blocks correspond to an index of one uplink reference signal resource, and indexes of a plurality of downlink reference signal resources or a plurality of synchronization signal blocks correspond to indexes of a plurality of uplink reference signal resources.

With reference to the first possible implementation of the second aspect or the second possible implementation of the second aspect, in a third possible implementation, the method further includes sending, to the terminal device, information that is about a correspondence between an index or indexes of one or more signal resources and a random access resource or a physical uplink control channel resource, where the one or more signal resources include an uplink reference signal resource, a downlink reference signal resource, and a synchronization signal block.

According to a third aspect, a communications apparatus is provided. The communications apparatus can implement the communication method according to the first aspect. For example, the communications apparatus may be a chip (such as a baseband chip or a communications chip) or a terminal device. The foregoing method may be implemented by using software or hardware, or by hardware executing corresponding software.

In a possible implementation, a processor and a memory are included in a structure of the communications apparatus. The processor is configured to support the apparatus in performing a corresponding function in the foregoing communication method. The memory is configured to couple to the processor, and the memory stores a program (an instruction) and/or data that are/is necessary for the apparatus. Optionally, the communications apparatus may further include a communications interface, configured to support communication between the apparatus and another network element.

In another possible implementation, the communications apparatus may include a unit and a module for performing a corresponding action in the foregoing method.

In still another possible implementation, a processor and a transceiver apparatus are included. The processor is coupled to the transceiver apparatus. The processor is configured to execute a computer program or an instruction, to control the transceiver apparatus to send and receive information, and when the processor executes the computer program or the instruction, the processor is further configured to implement the foregoing method. The transceiver apparatus may be a transceiver, a transceiver circuit, or an input/output interface. When the communications apparatus is the chip, the transceiver apparatus is the transceiver circuit or the input/output interface.

When the communications apparatus is a chip, a sending unit may be an output unit, for example, an output circuit or a communications interface, and a receiving unit may be an input unit, for example, an input circuit or a communications interface. When the communications apparatus is a network device, a sending unit may be a transmitter, and a receiving unit may be a receiver.

According to a fourth aspect, a communications apparatus is provided. The communications apparatus can implement the communication method according to the second aspect. For example, the communications apparatus may be a chip (such as a baseband chip or a communications chip) or a network device. The foregoing method may be implemented by using software or hardware, or by hardware executing corresponding software.

In a possible implementation, a processor and a memory are included in a structure of the communications apparatus. The processor is configured to support the apparatus in performing a corresponding function in the foregoing communication method. The memory is configured to couple to the processor, and the memory stores a program (an instruction) and/or data that are/is necessary for the apparatus. Optionally, the communications apparatus may further include a communications interface, configured to support communication between the apparatus and another network element.

In another possible implementation, the communications apparatus may include a unit and a module for performing a corresponding action in the foregoing method.

In still another possible implementation, a processor and a transceiver apparatus are included. The processor is coupled to the transceiver apparatus. The processor is configured to execute a computer program or an instruction, to control the transceiver apparatus to send and receive information, and when the processor executes the computer program or the instruction, the processor is further configured to implement the foregoing method. The transceiver apparatus may be a transceiver, a transceiver circuit, or an input/output interface. When the communications apparatus is the chip, the transceiver apparatus is the transceiver circuit or the input/output interface.

When the communications apparatus is a chip, a receiving unit may be an input unit, for example, an input circuit or a communications interface, and a sending unit may be an output unit, for example, an output circuit or a communications interface. When the communications apparatus is a terminal device, a receiving unit may be a receiver, and a sending unit may be a transmitter.

According to a fifth aspect, a computer-readable storage medium is provided. The computer-readable storage medium stores a computer program or an instruction, and when the computer program or the instruction is executed, the methods according to the foregoing aspects are implemented.

According to a sixth aspect, a computer program product including an instruction is provided. When the instruction is run on a computer, the computer is enabled to perform the methods according to the foregoing aspects.

BRIEF DESCRIPTION OF THE DRAWINGS

To describe technical solutions in embodiments of this application or in the background more clearly, the following describes accompanying drawings for describing the embodiments of this application or the background.

DETAILED DESCRIPTION OF ILLUSTRATIVE EMBODIMENTS

The following describes embodiments of this application with reference to accompanying drawings in the embodiments of this application.

Figure 1:
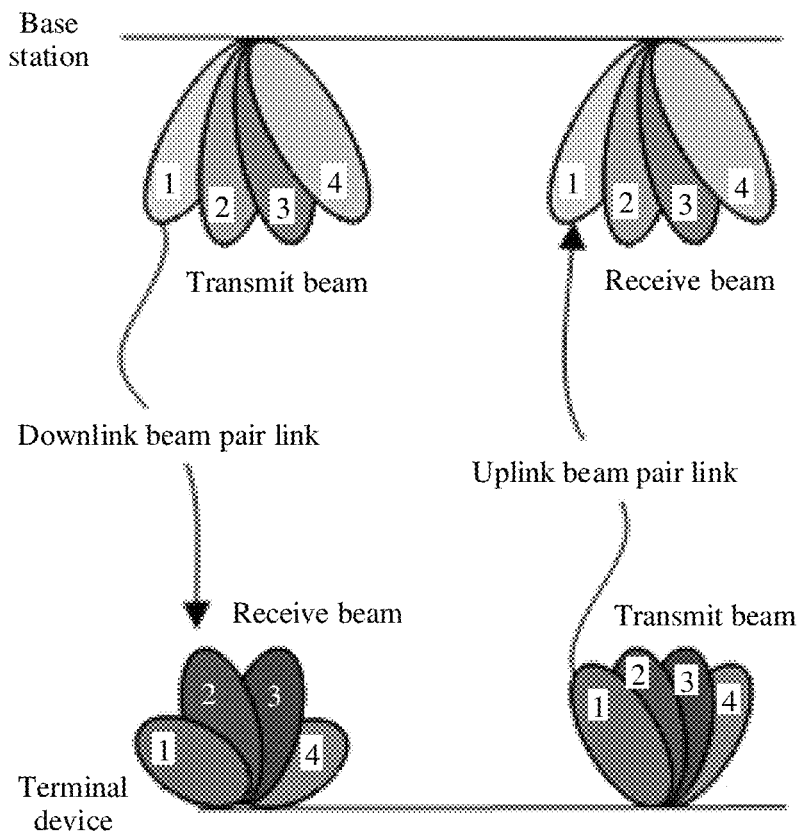
FIG. 1 is a schematic diagram of a scenario in which an uplink beam pair and a downlink beam pair are inconsistent.
Figure 2:
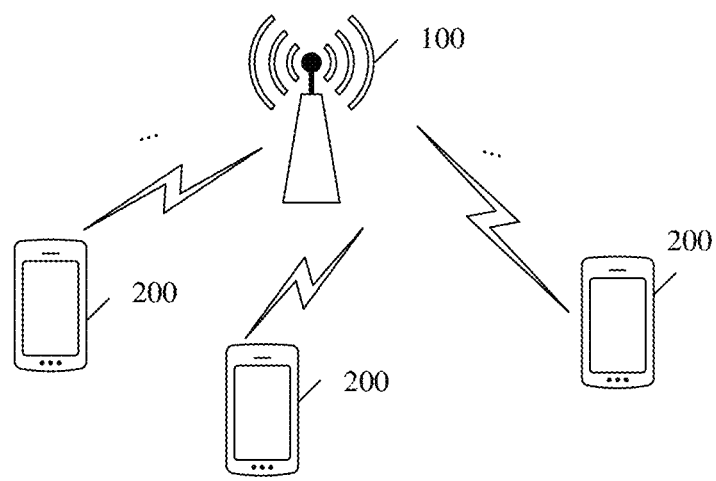
FIG. 2 is a schematic diagram of a communications system according to this application.

FIG. 2 is a schematic diagram of a communications system according to this application. The communications system may include one or more network devices 100 (only one is shown) and one or more terminal devices 200 connected to the network device 100.

The network device 100 may be a device that can communicate with the terminal device 200. The network device 100 may be any device having a wireless transceiver function, and includes but is not limited to a base station NodeB, an evolved NodeB (eNodeB), a base station in a 5th generation (fifth generation, 5G) communications system, a base station or network device in a future communications system, an access node in a WiFi system, a wireless relay node, a wireless backhaul node, and the like. The network device 100 may alternatively be a radio controller in a cloud radio access network (CRAN) scenario. The network device 100 may alternatively be a small cell, a transmission reference point (TRP), or the like. A specific technology and a specific device form that are used by the network device are not limited in the embodiments of this application.

The terminal device 200 is a device having a wireless transceiver function. The terminal device 200 may be deployed on land, including indoor, outdoor, handheld, wearable, or vehicle-mounted, or may be deployed on a water surface, for example, on a ship, or may be deployed in the air, for example, on a plane, a balloon, or a satellite. The terminal device may be a mobile phone, a tablet computer (for example, pad), a computer having a wireless transceiver function, a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application. The terminal device may sometimes be referred to as a user equipment (UE), an access terminal device, a UE unit, a mobile station, a mobile console, a remote station, a remote terminal device, a mobile device, a terminal, a wireless communications device, a UE agent, a UE apparatus, or the like.

It needs to be noted that the terms "system" and "network" may be used interchangeably in the embodiments of the present invention. "A plurality of" means two or more. In view of this, "a physical of" may also be understood as "at least two" in the embodiments of the present invention. The term "and/or" describes an association relationship between associated objects and represents that three relationships may exist. For example, A and/or B may represent the following three cases: Only A exists, both A and B exist, and only B exists. In addition, unless otherwise specified, the character "/" generally indicates an "or" relationship between the associated objects.

This application is applicable to a beam-based multicarrier communications system, for example, NR system.

This application is applicable to uplink communication (from a terminal device to a network device) and downlink communication (from a network device to a terminal device) in the communications system.

According to a long term evolution (LTE)/NR protocol, the uplink communication at a physical layer includes transmission of uplink physical channels and transmission of uplink signals. The uplink physical channels include a physical random access channel (PRACH), a physical uplink control channel (PUCCH), a physical uplink shared channel (PUSCH), and the like. The uplink signals include a sounding reference signal (SRS), a physical uplink control channel-demodulation reference signal (PUCCH-DMRS), a physical uplink shared channel-demodulation reference signal (PUSCH-DMRS), a phase tracking reference signal (PTRS), and the like. The downlink communication includes transmission of downlink physical channels and transmission of downlink signals. The downlink physical channels include a physical broadcast channel (PBCH), a physical downlink control channel (PDCCH), a physical downlink shared channel (PDSCH), and the like. The downlink signals include a primary synchronization signal/secondary synchronization signal (PSS/SSS), a physical downlink control channel-demodulation reference signal (PDCCH-DMRS), a physical downlink shared channel-demodulation reference signal (PDSCH-DMRS), a PTRS, and a channel state information-reference signal (CSI-RS), a cell reference signal (CRS) in LTE system, a tracking reference signal (TRS) in the NR system, and the like.

During the uplink communication and the downlink communication, all channels may have corresponding transmit and receive beams. A beam failure discussed in this application is mainly a beam failure on a downlink control channel. Specifically, after quality of communication between a transmit beam and a receive beam on a downlink control channel deteriorates, the beam failure may occur. In the NR protocol, in a periodicity, when quality of beams on all downlink control channels is lower than a threshold, it may be considered as one beam failure instance. When a quantity of consecutive beam failure instances reaches a maximum quantity (the maximum quantity is configured by the network device), it may be determined that a beam failure occurs.

Embodiments of this application provide a communication method and a communications apparatus. A terminal device receives information that is about an association relationship between a downlink beam and an uplink beam and that is sent by a network device, and sends, based on an uplink beam corresponding to an available downlink beam, a beam failure recovery request to the network device when the beam failure occurs, so that the network device can accurately receive the beam failure recovery request, thereby improving efficiency of beam failure recovery.

Figure 3:
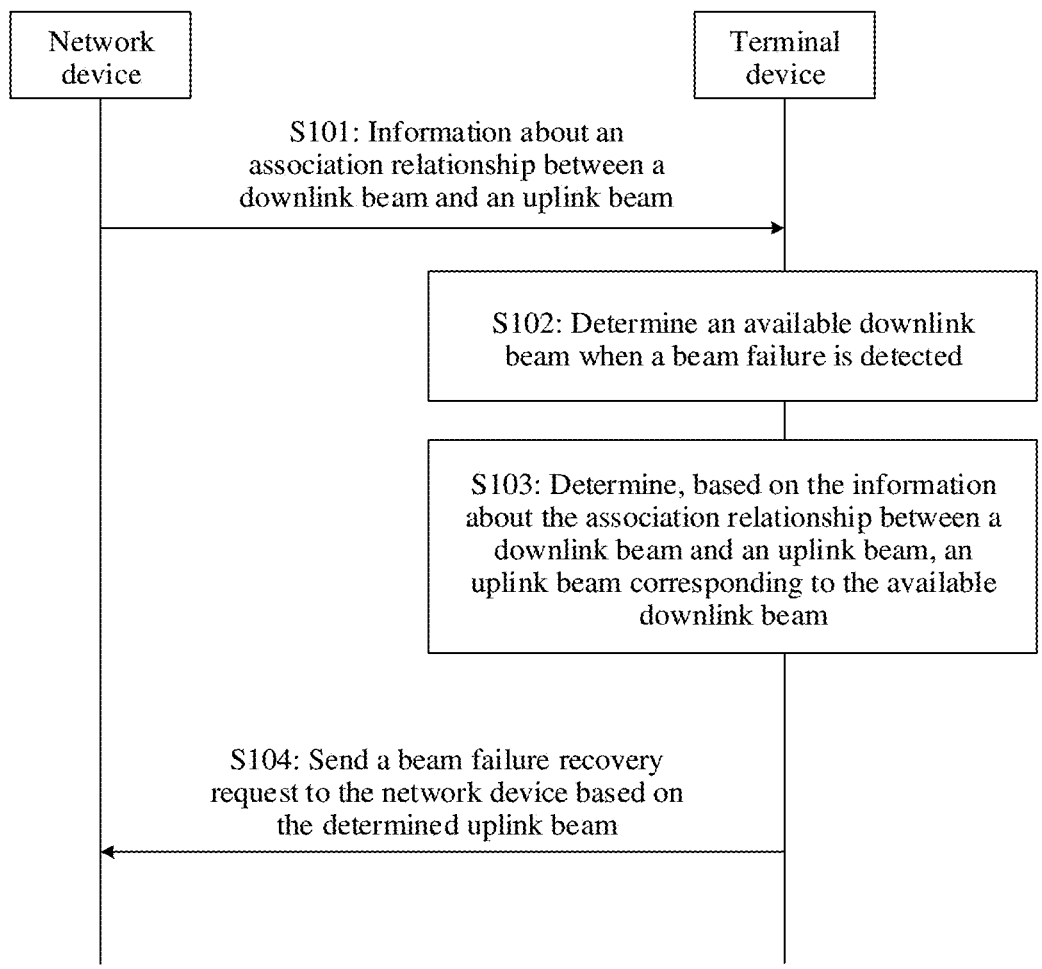
FIG. 3 is a schematic flowchart of a communication method according to an embodiment of this application.

FIG. 3 is a schematic flowchart of a communication method according to an embodiment of this application. The method may include the following steps.

S101: A network device sends information about an association relationship between a downlink beam and an uplink beam to a terminal device. The terminal device receives the information about the association relationship.

S102: The terminal device determines an available downlink beam when detecting a beam failure.

S103: The terminal device determines, based on the information about the association relationship between a downlink beam and an uplink beam, an uplink beam corresponding to the available downlink beam.

S104: The terminal device sends a beam failure recovery request to the network device based on the determined uplink beam. The network device receives the beam failure recovery request that is sent by the terminal device on the uplink beam, where the uplink beam is the uplink beam corresponding to the available downlink beam.

After accessing a network, the terminal device reports a radio access capability of the terminal device to the network device. The radio access capability includes information such as a quantity of (receive or transmit) beams of the terminal device (or a quantity of different spatial transmission filters), a quantity of beams that can be used when the terminal device sends or receives a signal, a quantity of radio frequency panels of the terminal device, and a quantity of antenna ports.

The quantity of radio frequency panels may be equivalent to a maximum quantity that is supported by the terminal device and that is of reference signal resource sets (for example, SRS resource sets) used for beam management. At a same moment, the terminal device can send only one SRS resource in each SRS resource set used for beam management. However, SRS resources in different SRS resource sets may be simultaneously sent. Therefore, the network device may infer, based on a maximum quantity that is reported by the terminal device and that is of SRS resource sets used for beam management, a quantity of panels of the terminal device or a quantity of different spatial transmission filters that can be used for simultaneous sending or simultaneous receiving.

The network device configures, based on the radio access capability reported by the terminal device and a current transmission requirement, radio resource control information for the terminal device by using higher layer signaling (for example, radio resource control (RRC) signaling). The radio resource control information includes an uplink/downlink reference signal resource, a synchronization signal, beam management configuration information, beam recovery configuration information, channel state information configuration information, and the like. Specifically, the network device configures, for the terminal device by using the higher layer signaling, a reference signal resource set for beam failure detection, where the set includes an index or indexes of one or more periodic CSI-RS resources. In addition, the network device configures a candidate beam set for the terminal device by using the higher layer signaling, where the set includes an index or indexes of one or more CSI-RS resources and an index or indexes of one or more SSB resources.

When the terminal device indicates, by reporting the radio access capability, that there is no consistency between the uplink beam and the downlink beam for the terminal device, the network device configures, based on information such as the reported quantity of beams and the reported quantity of panels (or a supported maximum quantity of SRS resource sets), resources used for uplink beam sweeping and downlink beam sweeping. Specifically, the network device may configure a quantity of SRS resources in each SRS resource set based on the quantity of beams of the terminal device, and configure a quantity of SRS resources based on the maximum quantity of SRS resource sets of the terminal device.

The network device triggers uplink/downlink beam sweeping by using downlink control information (DCI), a MAC-CE, RRC signaling, or the like. Beam sweeping is implemented by transmitting a reference signal with a specified index (by using different transmit/receive beams).

Specifically, during downlink transmission, the network device configures the terminal device to measure a specified reference signal set (or a part of the specified reference signal set) and report a measurement result, to measure quality of beams used to send these reference signals. During downlink beam measurement, a common measurement quantity is physical layer reference signal received power (L1-reference signal received power, L1-RSRP). The reference signal used for measurement may be a channel state information reference signal (CSI-RS) or a synchronization signal block (SSB).

During uplink transmission, the network device configures, based on the radio access capability reported by the terminal device, a resource used for uplink beam measurement. Specifically, the network device triggers transmission of an SRS resource set by using the DCI, and configures or indicates a transmit beam of a reference signal in the SRS resource set.

In some feasible examples, when a parameter "usage" in a configuration of the SRS resource set is used for beam management, there are the following cases.

If beam indications (spatial domain related information (spatial relation info) in a configuration of the SRS resources) corresponding to the SRS resources are a same reference signal index (for example, an SRS-index, an CSI-RS-index, or an SSB index), the terminal device needs to send resources in the resource set by using a fixed transmit beam. Specifically, when the reference signal index in the beam indications is the SRS index, the transmit beam is a transmit beam corresponding to the SRS, or when the reference signal index in the receive beam indications is a downlink RS index, the SSB index, or the CSI-RS index, a transmit beam corresponding to an SRS in the set needs to be determined based on a receive beam corresponding to the downlink reference signal index or the synchronization signal block index.

If no beam indication is configured for the resources in the SRS resource set, the terminal device needs to send different SRS resources in the set by using different beams as much as possible.

If beam indication information is configured for only one or more SRS resources in the SRS resource set, and no beam indication information is configured for another resource, the terminal device needs to send, based on a beam indication or beam indications of the one or more SRS resources for which the beam indication information is configured, different SRS resources in the set by using different beams.

In some other feasible examples, the network device configures one piece of signaling in the higher layer signaling (for example, included in the SRS resource set) to explicitly indicate, to the terminal device, a sending manner of the SRS resource set. For example, the signaling may include several bits or several states. Each state may indicate an uplink behavior, for example, transmission performed by the terminal device by using a fixed uplink beam, beam sweeping performed based on a quantity of beams that is reported by the terminal device, beam sweeping performed by using a receive beam of a downlink reference signal or a transmit beam of an uplink reference signal, or transmission performed based on a spatial configuration of each SRS resource.

For a sending manner in which beam sweeping is performed by using a receive beam of a downlink reference signal or a transmit beam of an uplink reference signal, the receive beam of the downlink reference signal or the transmit beam of the uplink reference signal may be configured in the SRS resource set, or may be configured in a specific SRS resource, for example, the first N SRS resources in the resource set (where N may be a value configured by the network device by using the higher layer signaling such as RRC signaling, or may be a fixed value agreed on in a protocol). Alternatively, beam indication information may be configured for only one or more SRS resources in the SRS resource set, and no beam indication information is configured for another resource. In this case, the terminal device needs to send, based on a beam indication or beam indications of the one or more SRS resources for which the beam indication information is configured, different SRS resources in the set by using different beams.

The foregoing beam sweeping indication manner is also applicable to a case in which the terminal device can simultaneously send SRS resources in a plurality of different SRS resource sets.

The network device may establish an association by using an uplink signal (for example, an SRS signal) and a downlink signal (for example, an SSB or a CSI-RS) that are sent by the terminal device. Specifically, the network device may receive, by using an antenna weight of a transmit beam used to send a downlink signal (for example, an SSB or a CSI-RS) in a candidate reference signal set, an uplink SRS resource from the terminal device, and select an SRS resource from the uplink SRS resource to establish the association. For ease of understanding, Table 1 shows a possible form of the association established by the network device.

TABLE 1

Example of an association between a downlink reference signal
resource and an uplink reference signal resource
Beam pair with channel reciprocity

| Transmit beam of a network device | Candidate reference signal | Receive beam of the network device | Uplink reference signal |
|---|---|---|---|
| TX #0 | CSI-RS #0 | RX #0 | SRS #1 |
| TX #1 | CSI-RS #1 | RX #1 | SRS #2 |
| TX #2 | CSI-RS #2 | RX #2 | SRS #0 |
| TX #3 | CSI-RS #3 | RX #3 | SRS #1 |

In this example, establishment of an association between a downlink beam and an uplink beam may be establishment of a correspondence between an index of a downlink reference signal resource or an index of a synchronization signal block and an index of an uplink reference signal resource. Certainly, an association between a downlink beam and an uplink beam may alternatively be a correspondence between another parameter of a downlink reference signal resource or a synchronization signal block and a corresponding parameter of an uplink reference signal resource.

The network device delivers the association relationship to the terminal device by using the higher layer signaling. Specifically, the network device may deliver the association relationship only for a reference signal in a reference signal set used for beam failure recovery, or may deliver the association relationship for another configured reference signal or another configured synchronization signal.

Specifically, in some feasible examples, the network device may configure a corresponding uplink reference signal resource for one or more downlink reference signal resources and/or one or more synchronization signals. The index of the downlink reference signal resource or the index of the synchronization signal block may be in a one-to-one correspondence with the index of the uplink reference signal resource (for example, one CSI-RS resource or one synchronization signal block is associated with one SRS resource). Alternatively, an index of one downlink reference signal resource or one synchronization signal block corresponds to indexes of a plurality of uplink reference signal resources, indexes of a plurality of downlink reference signal resources or a plurality of synchronization signal blocks correspond to an index of one uplink reference signal resource, or indexes of a plurality of downlink reference signal resources or a plurality of synchronization signal blocks correspond to indexes of a plurality of uplink reference signal resources.

When the index of the downlink reference signal resource is in a one-to-one correspondence with the index of the uplink reference signal resource, a possible correspondence delivered by the network device by using the higher layer signaling is shown in the following Table 2.

TABLE 2

Example of a one-to-one correspondence between a downlink reference
signal resource and an uplink reference signal resource

| Candidate downlink reference signal resource | Associated uplink reference signal resource |
|---|---|
| CSI-RS index #0 | SRS resource #1 |
| CSI-RS index #1 | SRS resource #2 |
| CSI-RS index #2 | SRS resource #0 |
| SSB index #3 | SRS resource #1 |

For other cases of the downlink reference signal resource and the uplink reference signal resource, possible correspondences delivered by the network device by using the higher layer signaling are similar to those in Table 2.

The terminal device evaluates quality of a control channel by using a reference signal that is in the reference signal resource set used for beam failure detection and that has a spatial quasi co-location relationship with a PDCCH-DMRS. When the network device does not configure the reference signal resource set used for beam failure detection, the terminal device may alternatively perform beam failure detection by using a reference signal resource that indicates spatial QCL information and that is in a TCI state of a control resource set within a current active bandwidth, or by using another reference signal that has a spatial quasi co-location relationship with the PDCCH-DMRS. Specifically, the terminal device estimates a block error rate (BLER) of a PDCCH (PDCCH-hypothetical-BLER) by using a reference signal that meets a condition. When hypothetical-BLERs of all downlink control channels are greater than a threshold (0.1 in NR system), a physical layer of the terminal device confirms one beam failure instance, and reports the beam failure instance to a media access control (MAC) layer on a terminal device side based on a specified periodicity. When a quantity of consecutive beam failure instances exceeds a maximum value configured by the network device, the MAC layer may determine that a beam failure occurs, and notify the physical layer of the terminal device of the beam failure.

After detecting the beam failure, the terminal device measures a reference signal resource in the candidate beam set based on a configuration of the network device, and determines the available downlink beam. Then, the terminal device determines the corresponding uplink beam based on the association relationship configured by the network device, and sends the beam failure recovery request.

Specifically, the terminal device determines an index of a downlink reference signal resource or a synchronization signal block corresponding to the available downlink beam, determines, based on the correspondence between an index of a downlink reference signal resource or a synchronization signal block and an index of an uplink reference signal resource, an index of an uplink reference signal resource corresponding to the determined index of the downlink reference signal resource or the synchronization signal block, and then sends the beam failure recovery request to the network device based on an uplink beam corresponding to the determined index of the uplink reference signal resource.

In some feasible examples, when one available downlink reference signal resource or one available synchronization signal is associated with a plurality of uplink reference signal resources, the terminal device may simultaneously send beam failure recovery request (including a PRACH and a PUCCH) by using a plurality of uplink beams based on a capability of the terminal device. Alternatively, the terminal device may independently select one of the uplink beams to send beam failure recovery request, or may alternately or sequentially send beam failure recovery request by using different beams in a time-division manner. Optionally, the foregoing sending manner may be extended to a case in which a PUCCH resource or a PRACH resource is associated with different uplink transmit beams, and the case may further be classified into a case in which a plurality of beams are used for sending, a case in which one of a plurality of beams is selected for sending, or a case in which different beams are used for sending in a time-division manner.

In some feasible examples, after detecting a beam failure recovery response of the network device on the selected available downlink beam, the terminal device cannot use an uplink beam used to send a beam failure recovery request (BFRQ) signal corresponding to the available downlink beam, to send the PUSCH and/or the PUCCH, unless the uplink beam is reconfigured.

In some feasible examples, when the terminal device detects, on the selected available downlink beam, that the beam failure recovery response of the network device indicates an uplink backoff state (namely, DCI 0_0), an uplink beam used by the terminal device to send a PUSCH scheduled by using the DCI may be an uplink beam used to send a beam failure recovery request signal corresponding to a downlink beam on which the DCI is located. It needs to be noted that, the beam failure recovery response may be downlink control information sent over a control resource set dedicated for the beam failure, namely, DCI that meets a condition and that is detected by the terminal device on the selected available downlink beam. The "DCI that meets a condition" may be the first DCI that is successfully detected by a user on the beam after the beam failure occurs, or during a periodicity after the beam failure occurs and before a DCI status 0_1 is detected, or during a periodicity after the beam failure occurs and before an uplink beam is selected through RRC reconfiguration or MAC-CE reactivation.

Further, the method may further include sending, by the network device to the terminal device, information that is about a correspondence between an index or indexes of one or more signal resources and a random access resource or a physical uplink control channel resource, where the one or more signal resources include an uplink reference signal resource, a downlink reference signal resource, and a synchronization signal block, and receiving, by the terminal device, the information about the correspondence.

In an implementation, the network device configures the correspondence between an index or indexes of one or more signal resources and a random access resource for the terminal device.

In some feasible examples, the network device may separately configure, for a plurality of uplink reference signal resources corresponding to a same downlink reference signal resource, corresponding random access resources for differentiation. For example, as shown in Table 3, the network device may configure different random access resources for different SRS resources associated with a same CSI-RS resource. The random access resource may be a random access preamble index (ra-preamble index) or a random access occasion (ra-ssb-occasion mask index or RA occasion). It needs to be noted that, different CSI-RS resources may be associated with a same SRS resource or different SRS resources, SRS resources with a same index associated with different CSI-RS resources may correspond to a same random access resource or different random access resources, and the random access resources associated with the SRS resource may have a same type or different types.

TABLE 3

Example of an uplink reference signal resource associated with a downlink reference signal resource and a random access resource

| Candidate downlink reference signal resource | Associated uplink reference signal resource and PRACH resource | |
| --- | --- | --- |
| CSI-RS #0 | SRS #1<br>PRACH resource #3 | SRS #2<br>PRACH resource #2 |

TABLE 3-continued

Example of an uplink reference signal resource associated with a downlink reference signal resource and a random access resource

| Candidate downlink reference signal resource | Associated uplink reference signal resource and PRACH resource | |
| --- | --- | --- |
| CSI-RS #1 | SRS #2<br>PRACH resource #2 | SRS #3<br>PRACH resource #3 |
| CSI-RS #2 | SRS #0<br>PRACH resource #0 | SRS #1<br>PRACH resource #1 |
| SSB index #0 | SRS #0<br>PRACH resource #1 | SRS #2<br>PRACH resource #2 |

In addition, the network device may further associate the SRS with the corresponding random access resource implicitly or in a manner agreed on in a protocol. For example, the network device may configure an SRS resource set for each downlink reference signal resource, or jointly configure an SRS resource set for all downlink reference signal resources. The resource set is sequentially mapped to random access resources configured for a single downlink reference signal resource. When a quantity of SRS resource sets is different from a quantity of random access resources configured for the downlink reference signal resource, mapping may be performed in a cyclic manner.

In some feasible examples, when a plurality of downlink reference signal resources correspond to one uplink reference signal resource, a possible correspondence delivered by the network device is shown in Table 4.

TABLE 4

Example of an uplink reference signal resource associated with a downlink reference signal resource and a random access resource

| Candidate downlink reference signal resource group | | Associated uplink reference signal resource |
| --- | --- | --- |
| CSI-RS #1<br>PRACH resource #1<br>SRS #0<br>PRACH resource #2 | CSI-RS #2<br>PRACH resource #2<br>CSI-RS #3<br>PRACH resource #3 | SRS #0<br><br>SRS #1 |

The network device may group the downlink reference signal resources, and associate each group with one uplink reference signal resource. After detecting the beam failure, if the terminal device detects that a downlink reference signal resource in a group can be used as a new downlink beam, the terminal device may determine a corresponding uplink reference signal resource and an uplink beam corresponding to the reference signal resource based on the group to which the downlink reference signal resource belongs.

In some feasible examples, when a plurality of downlink reference signal resources are associated with a plurality of uplink reference signal resources, in a possible implementation, the network device groups candidate downlink reference signal resources that are configured for the terminal device and that are used for beam failure recovery, and associates each downlink reference signal resource group with one uplink reference signal resource group. In another possible implementation, after the beam failure occurs, the terminal device selects an available candidate downlink reference signal resource, and associates the downlink reference signal resource with an uplink reference signal resource group. The terminal device may select an uplink reference signal resource from the uplink reference signal resource group, and send the beam failure recovery request based on a beam corresponding to the uplink reference signal resource. Alternatively, the terminal device may sequentially send, according to an order of reference signal resources in the uplink reference signal resource group, beam failure recovery requests based on beams corresponding to the reference signal resources. It needs to be noted that, the network device may separately configure a random access resource for a single uplink reference signal resource and/or a single downlink reference signal resource in each group, or may configure a random access resource for each uplink reference signal resource group and/or each downlink reference signal resource group. The network device may alternatively use a combination of the two manners. A possible correspondence delivered by the network device is shown in Table 5.

TABLE 5

Example of an uplink reference signal resource associated with a downlink reference signal resource and a random access resource

| Candidate downlink reference signal resource and associated PRACH resource | Associated uplink reference signal resource |
| --- | --- |
| {CSI-RS #0, PRACH resource #0}, {CSI-RS #1, PRACH resource #1}, {SSB #1, PRACH resource #2} | {SRS #0, PRACH resource #5}, {SRS #1, PRACH resource #6} |
| {CSI-RS #2, PRACH resource #3}, {SSB #0, PRACH resource #4} | {SRS #1, PRACH resource #7}, {SRS #2, PRACH resource #8} |

It needs to be noted that, in Table 5, PRACH resources with different numbers and corresponding specific resources may have a same resource type or different resource types.

In another implementation, the network device configures a correspondence between an index or indexes of one or more signal resources and PUCCH resource for the terminal device.

In some feasible examples, the network device configures, for the terminal device, a PUCCH resource dedicated for beam failure recovery. The configuration may include a configuration of a time-frequency position of the PUCCH resource, frequency hopping information, PUCCH format information, or the like. The PUCCH resource may be associated with an uplink reference signal resource or a downlink reference signal resource. Alternatively, the PUCCH resource may be configured for a bandwidth part (BWP), a carrier, or a terminal device. In addition, the network device may not pre-configure, for the terminal device, the PUCCH resource dedicated for beam failure recovery, but directly uses an originally allocated PUCCH resource (for example, a PUCCH resource used for periodic beam quality reporting or periodic channel quality reporting) after detecting the beam failure.

The network device may set one or more specified reporting formats (for example, a format 0, a format 1, a format 2, a format 3, and/or a format 4) for the beam failure, or may set a special PUCCH format. The special PUCCH format may include but is not limited to an RS ID and a reference signal received power (RSRP) value that correspond to an available beam, channel state information (for example, a PMI, an RI, and a CQI) of an available beam, and IDs of a component carrier (CC), a BWP, and a control resource set (CORESET) in which the beam failure currently occurs.

The terminal device tracks, based on a higher layer signaling configuration, quality of a beam on the control channel by using the downlink reference signal resource or the synchronization signal. When the terminal device finds that quality of the beam on the downlink control channel cannot meet a requirement, the terminal device determines that the beam failure occurs, and enters a beam failure recovery procedure.

The terminal device measures the reference signal resource or the synchronization signal in the candidate beam set, and selects, from the candidate beam set, an available downlink beam that meets the requirement (for example, meets an RSRP threshold configured by the network device). In addition, the terminal device selects, based on an association relationship that is between a downlink reference signal resource or a synchronization signal and an uplink reference signal and that is configured by the network device, a corresponding uplink beam for sending. The terminal device reports, by using the PUCCH resource, an index of the available beam or an index of the reference signal resource (for example, the CSI-RS index or the SSB index) and other information that needs to be reported.

In some feasible examples, the terminal device may not necessarily send a beam failure recovery request completely based on the association relationship configured by the network device, but may change the association relationship. For ease of understanding, the terminal device may maintain a table similar to Table 6, and select, based on a receive beam of an available downlink reference signal resource, a corresponding uplink transmit beam to send the request.

TABLE 6

Example of an association relationship between an uplink reference signal resource and a downlink reference signal resource

| Candidate reference signal resource | Receive beam of a terminal device | Associated uplink reference signal resource | Transmit beam of a terminal device |
| --- | --- | --- | --- |
| CSI-RS #0, CSI-RS #1, SRS #1 | RX #1 | SRS #0, SRS #1 | TX #0 |

Optionally, the terminal device may include an SRS index in the reported information. The SRS index may be an index of an uplink reference signal resource corresponding to a beam used to send a current PUCCH resource, or may be another SRS index (for example, an index of an uplink reference signal resource corresponding to an uplink beam that the terminal device expects a network to schedule, or an index of an uplink reference signal resource that does not correspond to an available beam of a current BWP/CC).

Optionally, the information reported by the terminal device may include one piece of indication information (for example, an ID or a bit-mapping string). The indication information is used to indicate an uplink transmit beam of the current PUCCH (that is, indicate an uplink reference signal corresponding to the beam). For example, the user reports, in PUCCH resource, an index of a reference signal or a synchronization signal block corresponding to the available beam. In a configuration sent by the network device to the terminal device, the index may correspond to one or more uplink reference signals. In this case, the terminal device may include an index (a bit string or an ID) in the PUCCH. For example, when a plurality of uplink reference signal resources (for example, an SRS #0 and an SRS #1) are associated, a binary bit string '10' may be used to indicate that the terminal device sends the PUCCH resource by using a beam corresponding to the SRS #0.

It needs to be noted that, the PUCCH resource may alternatively be extended to a scheduling request resource (SR resource), namely, an index of an SR resource associated with the uplink/downlink reference signal resource or the synchronization signal in the association relationship configured by the network device.

In another possible case, the network device configures, for the terminal device, an SR resource dedicated for beam failure recovery. A PUCCH resource included in the SR resource has no beam indication information (or the beam indication information becomes invalid after a beam failure occurs on the terminal device). In addition, the network device configures an association relationship between an uplink beam and a downlink beam for the terminal device. After the beam failure occurs, the terminal device detects the downlink reference signal, finds a new available downlink beam, and determines a corresponding uplink beam based on the association relationship, to send the beam failure recovery request. The SR resource used for beam failure recovery may be multiplexed with different uplink beams in a time division or frequency division manner, or the like. For example, assuming that a periodicity of the SR resource is T slots, and a periodicity offset is $T_{offset}$ slots, a slot in which the SR resource is located is $T*k+T_{offset}$, where k=0, 1, 2, 3 . . . . In this case, an SR resource in a $(T*k*N+n*T+T_{offset})^{th}$ slot (n=0, 1, 2, . . . , N−1, and k=0, 1, 2, 3 . . . ) may be allocated to an $n^{th}$ element in a set that includes N reference signal resources or N synchronization signals. In another possible case, after the beam failure occurs, the terminal device detects quality of the downlink beams and determines an available downlink beam. In addition, the terminal device selects an SR resource based on beam indication information corresponding to a PUCCH resource in the SR resource configured by the network device, and sends a scheduling request. Specifically, the resource used to send the scheduling request may be directly selected based on an index of a reference signal resource corresponding to an identified available downlink beam (for example, an index of an RS resource in beam indication information corresponding to the PUCCH resource in the SR resource is an index of a reference signal resource corresponding to the available beam (or another RS resource that is spatially quasi co-located)). In this case, the terminal device sends the scheduling request or the beam failure recovery request by using the SR resource. Alternatively, the terminal device determines a corresponding uplink beam based on the downlink beam and the association relationship that is between an uplink beam and a downlink beam and that is configured by the network device, and then determines an SR resource used for the beam failure recovery request, to send the scheduling request or the beam failure recovery request, where the beam indication information corresponding to the PUCCH resource in the SR resource is the uplink beam. Alternatively, the terminal device independently selects an SR resource (based on consistency or the like), to send the scheduling request or the beam failure recovery request.

It needs to be noted that, in all the foregoing embodiments, the index of the CSI-RS resource, the index of the synchronization signal block, the random access resource, and the physical uplink control channel resource that are configured by the network device may not be located on a same BWP or a same CC.

In some feasible embodiments, the network device configures corresponding BWP information or corresponding CC information for some or all of the index of the CSI-RS resource, the index of the synchronization signal block, the random access resource, and the physical uplink control channel resource. After the beam failure occurs, the terminal device detects quality of a candidate beam on a BWP or a CC on which the CSI-RS resource or the synchronization signal is located, then needs to switch to a BWP or a CC on which the random access resource and the physical uplink control channel resource are located, to send the beam failure recovery request, and waits for a beam on a specified BWP or a specified CC. In another possible case, in the configuration of the network device, there is a specific correspondence between an uplink BWP on which the uplink reference signal resource is located and a downlink BWP on which the index of the downlink reference signal resource or the synchronization signal block corresponding to the uplink reference signal resource is located. For example, an identifier of the uplink BWP (BWP ID) is the same as an identifier of the downlink BWP, or a correspondence between an uplink BWP and a downlink BWP is directly configured by the network device.

In some feasible embodiments, the network device may configure corresponding BWP information or corresponding CC information for the CSI-RS index or the SSB index in the candidate beam set. After the beam failure occurs, the terminal device may switch to a BWP or a CC on which the CSI-RS index or the SSB index in the beam set is located, to detect beam quality.

In some feasible embodiments, a specified BWP or a specified CC is configured by the network device by using the RRC signaling, or is agreed on in a protocol. After the beam failure occurs, the terminal device may switch back to the specified BWP or the specified CC, to send the beam failure recovery request.

The multi-CC scenario described above may also be extended to a carrier aggregation scenario such as a primary cell (PCell) and a secondary cell (SCell). For example, when the beam failure occurs in the SCell, the terminal device may switch back to the PCell to send an uplink beam failure recovery request, and wait for a response from the network device in the PCell. In another possible case, when the beam failure occurs in the SCell, the terminal device sends a beam request in the SCell in which the beam failure currently occurs, or switches to another SCell to send a beam request, and waits for a response from the network device in the SCell in which the beam failure recovery request is sent. In another possible case, regardless of a cell in which the terminal device sends an uplink beam failure recovery request, the terminal device waits for a response in a specified cell, for example, an SCell or a PCell in which the beam failure occurs or an SCell having a specified cell identifier.

In addition, the correspondence between an index of an uplink reference signal resource and an index of a downlink reference signal resource or an index of a synchronization signal block may not be configured by the network device, but is explicitly specified in an agreed manner. For example, the network device configures only a corresponding random access resource or a corresponding physical uplink control channel resource for the downlink reference signal resource, and the uplink reference signal resource is directly associated with a downlink reference signal resource or a synchronization signal that has a same index (for example, a same ID number). When the network device indicates an uplink reference signal resource having a specific index as a beam indication, a beam corresponding to the uplink reference signal resource needs to be determined based on a beam of a downlink reference signal resource or a synchronization signal that has the same index.

According to the communication method provided in the embodiments of this application, the terminal device receives the information that is about the association relationship between a downlink beam and an uplink beam and that is sent by the network device, and sends, based on the uplink beam corresponding to the available downlink beam, the beam failure recovery request to the network device when the beam failure occurs, so that the network device can accurately receive the beam failure recovery request, thereby improving efficiency of beam failure recovery.

Figure 4:
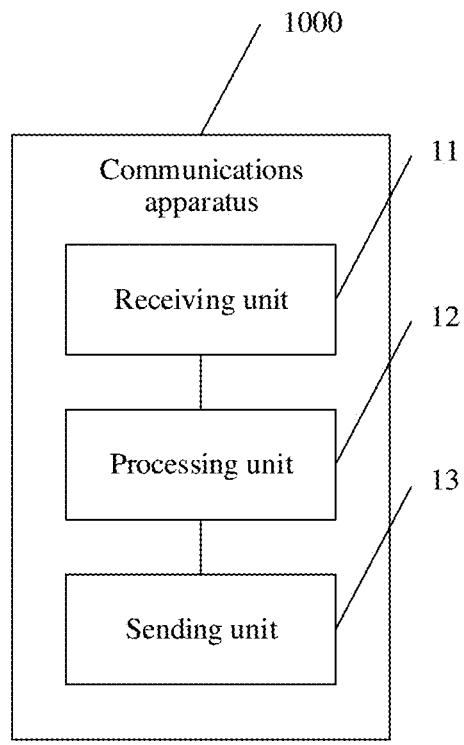
FIG. 4 is a schematic structural diagram of a communications apparatus according to an embodiment of this application.

Based on a same concept as that of the communication method in the foregoing embodiment, as shown in FIG. 4, an embodiment of this application further provides a communications apparatus 1000. The communications apparatus may be applied to the communication method shown in FIG. 3. The communications apparatus 1000 may be the terminal device 200 shown in FIG. 2, or may be a component (for example, a chip) applied to the terminal device 200. The communications apparatus 1000 includes a receiving unit 11, configured to receive information that is about an association relationship between a downlink beam and an uplink beam and that is sent by a network device, a processing unit 12, configured to determine an available downlink beam when a beam failure is detected, where the processing unit 12 is further configured to determine, based on the information about the association relationship between a downlink beam and an uplink beam, an uplink beam corresponding to the available downlink beam, and a sending unit 13, configured to send a beam failure recovery request to the network device based on the determined uplink beam.

In an implementation, the information about the association relationship includes a correspondence between an index of a downlink reference signal resource or a synchronization signal block and an index of an uplink reference signal resource.

The processing unit 12 is configured to determine an index of a downlink reference signal resource or a synchronization signal block corresponding to the available downlink beam, and determine, based on the correspondence between an index of a downlink reference signal resource or a synchronization signal block and an index of an uplink reference signal resource, an index of an uplink reference signal resource corresponding to the determined index of the downlink reference signal resource or the synchronization signal block.

The sending unit 13 is configured to send the beam failure recovery request to the network device based on an uplink beam corresponding to the determined index of the uplink reference signal resource.

In another implementation, the receiving unit 11 is further configured to receive information that is about a correspondence between an index or indexes of one or more signal resources and a random access resource or a physical uplink control channel resource and that is sent by the network device, where the one or more signal resources include an uplink reference signal resource, a downlink reference signal resource, and a synchronization signal block.

For more detailed descriptions of the receiving unit 11, the processing unit 12, and the sending unit 13, directly refer to related descriptions of the terminal device in the method embodiment shown in FIG. 3. Details are not described herein again.

Figure 5:
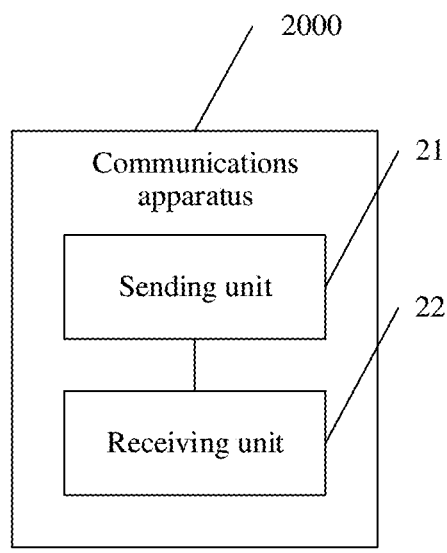
FIG. 5 is a schematic structural diagram of another communications apparatus according to an embodiment of this application.

Based on a same concept as that of the communication method in the foregoing embodiment, as shown in FIG. 5, an embodiment of this application further provides a communications apparatus 2000. The communications apparatus may be applied to the communication method shown in FIG. 3. The communications apparatus 2000 may be the network device 100 shown in FIG. 2, or may be a component (for example, a chip) applied to the network device 100. The communications apparatus 2000 includes a sending unit 21, configured to send information about an association relationship between a downlink beam and an uplink beam to a terminal device, and a receiving unit 22, configured to receive a beam failure recovery request that is sent by the terminal device on the uplink beam, where the uplink beam is an uplink beam corresponding to an available downlink beam.

In an implementation, the sending unit 21 is further configured to send, to the terminal device, information that is about a correspondence between an index or indexes of one or more signal resources and a random access resource or a physical uplink control channel resource, where the one or more signal resources include an uplink reference signal resource, a downlink reference signal resource, and a synchronization signal block.

For more detailed descriptions of the sending unit 21 and the receiving unit 22, directly refer to related descriptions of the network device in the method embodiment shown in FIG. 3. Details are not described herein again.

An embodiment of this application further provides a communications apparatus. The communications apparatus is configured to perform the foregoing communication methods. Some or all of the foregoing communication methods may be implemented by using hardware, or may be implemented by using software.

Optionally, in specific implementation, the communications apparatus may be a chip or an integrated circuit.

Optionally, when some or all of the communication methods in the foregoing embodiments are implemented by using software, the communications apparatus includes a memory, configured to store a program, and a processor, configured to execute the program stored in the memory, so that when the program is executed, the communications apparatus is enabled to implement the communication methods provided in the foregoing embodiments.

Optionally, the memory may be a physically independent unit, or may be integrated with the processor.

Optionally, when some or all of the communication methods in the foregoing embodiments are implemented by using software, the communications apparatus may alternatively include only a processor. A memory configured to store a program is located outside the communications apparatus. The processor is connected to the memory by using a circuit or wire, and is configured to read and execute the program stored in the memory.

The processor may be a central processing unit (CPU), a network processor (NP), or a combination of a CPU and an NP.

The processor may further include a hardware chip. The hardware chip may be an application-specific integrated circuit (ASIC), a programmable logic device (PLD), or a combination of an ASIC and a PLD. The PLD may be a complex programmable logic device (CPLD), a field-programmable gate array (FPGA), generic array logic (GAL), or any combination thereof.

The memory may include a volatile memory, for example, a random-access memory (RAM). The memory may alternatively include a non-volatile memory, for example, a flash memory, a hard disk drive (HDD), or a solid-state drive (SSD). The memory may alternatively include a combination of the foregoing types of memories.

Figure 6:
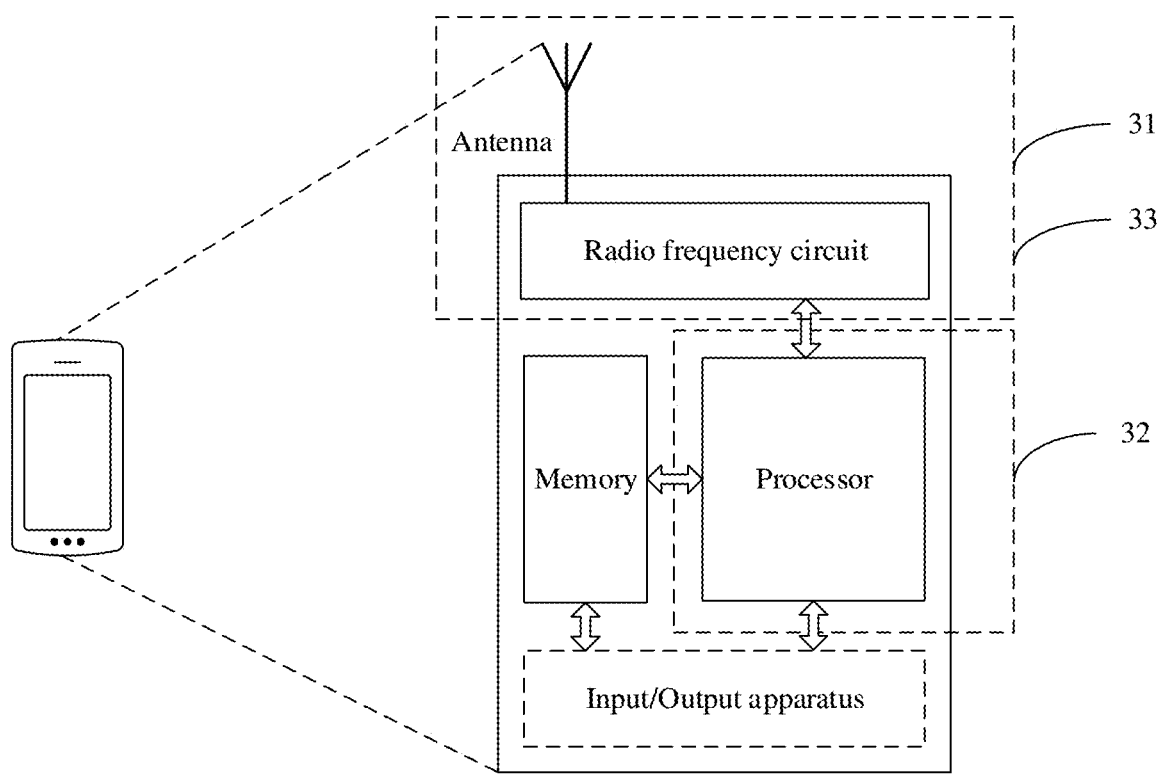
FIG. 6 is a schematic diagram of a hardware structure of a communications apparatus according to an embodiment of this application.

FIG. 6 is a simplified schematic structural diagram of a terminal device. For ease of understanding and illustration, in FIG. 6, the terminal device is, for example, a mobile phone. As shown in FIG. 6, the terminal device includes a processor, a memory, a radio frequency circuit, an antenna, and an input/output apparatus. The processor is mainly configured to process a communications protocol and communication data, control the terminal device, execute a software program, process data of the software program, and the like. The memory is mainly configured to store a software program and data. A radio frequency circuit is mainly configured to perform conversion between a baseband signal and a radio frequency signal, and process the radio frequency signal. The antenna is mainly configured to transmit and receive a radio frequency signal in a form of an electromagnetic wave. The input/output apparatus such as a touchscreen, a display, or a keyboard is mainly configured to receive data entered by a user and output data to the user. It needs to be noted that some types of terminal devices may have no input/output apparatus.

When data needs to be sent, after performing baseband processing on the to-be-sent data, the processor outputs a baseband signal to the radio frequency circuit, and the radio frequency circuit performs radio frequency processing on the baseband signal and then sends a radio frequency signal to the outside in a form of an electromagnetic wave by using the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 6 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a receiving unit and a sending unit (which may also be collectively referred to as a transceiver unit) of the terminal device, and the processor having a processing function may be considered as a processing unit of the terminal device. As shown in FIG. 6, the terminal device includes a receiving unit 31, a processing unit 32, and a sending unit 33. The receiving unit 31 may also be referred to as a receiver, a receiver circuit, or the like. The sending unit 33 may also be referred to as a transmitter, a transmitter circuit, or the like. The processing unit may also be referred to as a processor, a processing board, a processing module, a processing apparatus, or the like.

For example, in an embodiment, the receiving unit 31 is configured to perform a function of the terminal device in step S101 in the embodiment shown in FIG. 3. The processing unit 32 is configured to perform functions in steps S102 and S103 in the embodiment shown in FIG. 3. The sending unit 33 is configured to perform a function of the terminal device in step S104 in the embodiment shown in FIG. 3.

Figure 7:
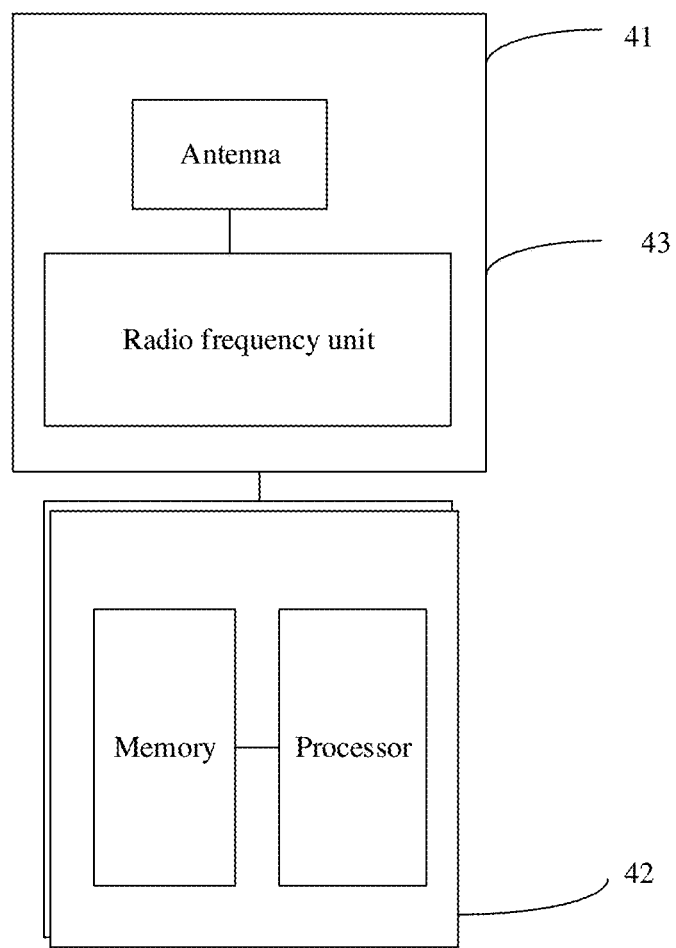
FIG. 7 is a schematic diagram of a hardware structure of another communications apparatus according to an embodiment of this application.

FIG. 7 is a simplified schematic structural diagram of a network device. The network device includes a part 42 and a part for radio frequency signal transmission/reception and conversion. The part for radio frequency signal transmission/reception and conversion further includes a receiving unit part 41 and a sending unit part 43 (which may also be collectively referred to as a transceiver unit). The part for radio frequency signal transmission/reception and conversion is mainly configured to send/receive a radio frequency signal and perform conversion between a radio frequency signal and a baseband signal. The part 42 is mainly configured to perform baseband processing, control the network device, and the like. The receiving unit 41 may also be referred to as a receiver, a receiver, a receiver circuit, or the like. The sending unit 43 may also be referred to as a transmitter, a transmitter, a transmitter, a transmitter circuit, or the like. The part 42 is usually a control center of the network device, and may usually be referred to as a processing unit. The part 42 is configured to control the network device to perform steps performed by the network device in FIG. 3, FIG. 4, or FIG. 5. For details, refer to the foregoing descriptions of the related parts.

The part 42 may include one or more boards. Each board may include one or more processors and one or more memories. The processor is configured to read and execute a program in the memory to implement a baseband processing function and control the network device. If there are a plurality of boards, the boards may be interconnected to enhance a processing capability. In an optional implementation, alternatively, the plurality of boards may share one or more processors, or the plurality of boards share one or more memories, or the plurality of boards simultaneously share one or more processors.

For example, in an embodiment, the sending unit 43 is configured to perform a function of the network device in step S101 in the embodiment shown in FIG. 3, and the receiving unit 41 is configured to perform a function of the network device in step S104 in the embodiment shown in FIG. 3.

The network device and the terminal device in the foregoing apparatus embodiments completely correspond to the network device and the terminal device in the method embodiments. A corresponding module or unit performs a corresponding step. For example, a transmitting module (a transmitter) performs a transmitting step in the method embodiment, a receiving module (a receiver) performs a receiving step in the method embodiment, and other steps than transmitting and receiving may be performed by a processing module (a processor). For a function of a specific module, refer to a corresponding method embodiment. The transmitting module and the receiving module may form a transceiver module, and the transmitter and the receiver may form a transceiver to jointly implement transmitting and receiving functions. There may be one or more processors.

It may be clearly understood by a person skilled in the art that, for convenient and brief description, for a detailed working process of the foregoing system, apparatus, and unit, refer to a corresponding process in the foregoing method embodiments. Details are not described herein again.

In the several embodiments provided in this application, it needs to be understood that the disclosed system, apparatus, and method may be implemented in another manner. For example, the unit division is merely logical function division and may be other division during actual implementation. For example, a plurality of units or components may be combined or integrated into another system, or some features may be ignored or not performed. The displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may or may not be physical units, to be specific, may be located in one position, or may be distributed on a plurality of network units. Some or all of the units may be selected based on actual requirements to achieve the objectives of the solutions of the embodiments.

All or some of the foregoing embodiments may be implemented by using software, hardware, firmware, or any combination thereof. When software is used for implementation, all or some of the embodiments may be implemented in a form of a computer program product. The computer program product includes one or more computer programs or instructions. When the computer programs or instructions are loaded and executed on a computer, all or some of the procedures or functions according to the embodiments of this application are generated. The computer may be a general-purpose computer, a dedicated computer, a computer network, or another programmable apparatus. The computer instruction may be stored in a computer-readable storage medium, or may be transmitted by using a computer-readable storage medium. The computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a read-only memory (ROM), a random access memory (RAM), or a magnetic medium such as a floppy disk, a hard disk, a magnetic tape, a magnetic disk, or an optical medium such as a digital versatile disc (DVD), or a semiconductor medium such as a solid-state disk (SSD).

What is claimed is:

1. A communication method, comprising:
receiving, from a network device, association information comprising one or more association relationships between one or more downlink beams and one or more uplink beams, wherein each association relationship of one or more association relationships is an association between a downlink beam of the one or more downlink beams and at least one uplink beam of the one or more uplink beams;
determining an available downlink beam in response to detecting a beam failure, wherein the available downlink beam is a downlink beam of the one or more downlink beams of the one or more downlink beams;
determining a first uplink beam according to the downlink beam, wherein the first uplink beam is an uplink beam that is of the at least one uplink beam and that is associated with the downlink beam by an association relationship identified in the association information;
sending a beam failure recovery request to the network device using the first uplink beam;
receiving a beam failure recovery response sent by the network device; and
sending, using the first uplink beam, after receiving the beam failure recovery response and before receiving beam configuration information sent by the network device, at least one of a physical uplink control channel or a physical uplink shared channel, wherein the beam configuration information indicates a second uplink beam.

2. The method according to claim 1, wherein the beam failure recovery response is downlink control information sent over a control resource set dedicated for the beam failure.

3. The method according to claim 1, wherein the beam configuration information is configured by using radio resource control signaling or is activated by using a media access control (MAC) control element (CE).

4. The method according to claim 1, wherein an index of the first uplink beam is associated, in the association information, with an index of the downlink beam.

5. The method according to claim 4, wherein the receiving the association information comprises receiving the association information in higher layer signaling.

6. The method according to claim 1, wherein the determining the available downlink beam comprises selecting, as the available downlink beam, from candidate beam set, a downlink beam that meets a reference signal received power (RSRP) threshold.

7. A communications apparatus, comprising:
a transmitter;
a receiver;
a processor; and
a non-transitory computer-readable storage medium storing a program to be executed by the processor, the program including instructions to:
receive, from a network device, association information comprising one or more association relationships between one or more downlink beams and one or more uplink beams, wherein each association relationship of one or more association relationships is an association between a downlink beam of the one or more downlink beams and at least one uplink beam of the one or more uplink beams;
determine an available downlink beam in response to detecting a beam failure, wherein the available downlink beam is a downlink beam of the one or more downlink beams of the one or more downlink beams;
determine a first uplink beam according to the downlink beam, wherein the first uplink beam is an uplink beam that is of the at least one uplink beam and that is associated with the downlink beam by an association relationship identified in the association information;
cause the transmitter to send a beam failure recovery request to the network device using the first uplink beam;
receive, through the receiver, a beam failure recovery response sent by the network device; and
cause, after receiving the beam failure recovery response and before receiving beam configuration information sent by the network device, the transmitter to send, using the first uplink beam, at least one of a physical uplink control channel or a physical uplink shared channel, wherein the beam configuration information indicates a second uplink beam.

8. The apparatus according to claim 7, wherein the beam failure recovery response is downlink control information sent over a control resource set dedicated for the beam failure.

9. The apparatus according to claim 7, wherein the beam configuration information is configured by using radio resource control signaling or is activated by using a media access control (MAC) control element (CE).

10. The apparatus according to claim 7, wherein an index of the first uplink beam is associated, in the association information, with an index of the downlink beam.

11. The apparatus according to claim 10, wherein the instructions to receive the association information include instructions to receive the association information in higher layer signaling.

12. The apparatus according to claim 7, wherein the instructions to determine the available downlink beam include instructions to select, as the available downlink beam, from candidate beam set, a downlink beam that meets a reference signal received power (RSRP) threshold.

13. A non-transitory computer-readable storage medium storing a computer program for execution by a computer system, the computer program having instructions for:
   receiving, from a network device, association information comprising one or more association relationships between one or more downlink beams and one or more uplink beams, wherein each association relationship of one or more association relationships is an association between a downlink beam of the one or more downlink beams and at least one uplink beam of the one or more uplink beams;
   determining an available downlink beam in response to detecting a beam failure, wherein the available downlink beam is a downlink beam of the one or more downlink beams of the one or more downlink beams;
   determining a first uplink beam according to the downlink beam, wherein the first uplink beam is an uplink beam that is of the at least one uplink beam and that is associated with the downlink beam by an association relationship identified in the association information;
   sending a beam failure recovery request to the network device using the first uplink beam;
   receiving a beam failure recovery response sent by the network device; and
   sending, using the first uplink beam, after receiving the beam failure recovery response and before receiving beam configuration information sent by the network device, at least one of a physical uplink control channel or a physical uplink shared channel, wherein the beam configuration information indicates a second uplink beam.

14. The non-transitory computer-readable storage medium according to claim 13, wherein the beam failure recovery response is downlink control information sent over a control resource set dedicated for the beam failure.

15. The non-transitory computer-readable storage medium according to claim 13, wherein the beam configuration information is configured by using radio resource control signaling or is activated by using a media access control (MAC) control element (CE).

16. The non-transitory computer-readable storage medium according to claim 13, wherein an index of the first uplink beam is associated, in the association information, with an index of the downlink beam.

17. The non-transitory computer-readable storage medium according to claim 16, wherein the instructions for receiving the association information include instructions for receiving the association information in higher layer signaling.

18. The non-transitory computer-readable storage medium according to claim 13, wherein the instructions for determining the available downlink beam include instructions for selecting, as the available downlink beam, from candidate beam set, a downlink beam that meets a reference signal received power (RSRP) threshold.

* * * * *